Patented Dec. 8, 1953

2,662,082

UNITED STATES PATENT OFFICE 2,662,082

PHENANTHRIDINE COMPOUNDS

Wallace Frank Short, Douglas Archibald Peak, and Thomas Iswel Watkins, Nottingham, England, assignors to Boots Pure Drug Company Limited, Nottingham, England, a British company No Drawing. Application September 10, 1951, Serial No. 245,964

Claims priority, application Great Britain September 11, 1950

4 Claims. (Cl. 260—286)

This invention is concerned with new derivatives of 2:7-diamino-9-phenyl phenanthridine.

It is known that 2:7-diamino-9-phenyl-10-methylphenanthridinium bromide, also called dimidium bromide, has chemotherapeutic activity against trypanosomes and is used in the treatment of bovine trypanosomiasis.

A method for the preparation of quaternary salts of 2:7-diamino-9-phenyl-phenanthridine having an alkyl or aralkyl group in the 10-position is described and claimed in British patent specification No. 587,673. The salts are said to have trypanocidal activity. Only three substances are mentioned specifically in the said specification, namely 2:7-diamino-9-phenyl-10-methylphenanthridinium bromide and the corresponding chloride and sulphate. It will be noted that in all these three substances the radical in the 10-position is methyl. There is no suggestion in the said specification that the substitution for the 10-methyl radical of another alkyl or aralkyl radical would have any effect upon the degree of activity of the products.

The invention is based on the discovery that the new and hitherto undescribed quaternary 2:7 - diamino - 9 - phenyl - 10 - ethylphenanthridinium, 2:7 - diamino - 9 - phenyl - 10-propylphenanthridinium and 2:7 - diamino - 9-phenyl - 10 - allylphenanthridinium salts have unexpectedly better chemotherapeutic properties than those of the salts of the corresponding 10-methyl compound. They all possess trypanocidal activity considerably greater than that displayed by dimidium bromide and, furthermore, they have a substantially lower degree of toxicity to animals. It has not previously been suggested that the trypanocidal properties of quaternary aminophenanthridine derivatives are dependent upon the nature of the quaternating radical and such a result would have been impossible to predict a priori.

The compounds of the present invention which are of the general formula:

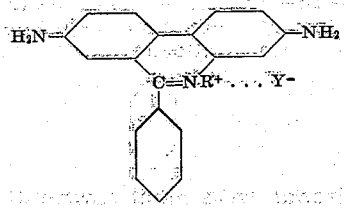

in which R represents an ethyl, propyl or allyl radical and Y represents an anion, may be prepared by methods analogous to those known for converting 2:7-diamino-9-phenylphenanthridine into the corresponding 10-methyl quaternary salts using, in place of the methyl compound employed in the known methods, the corresponding ethyl, propyl or allyl compound. In particular, the compounds of the invention may be produced by treating a substance of the general formula:

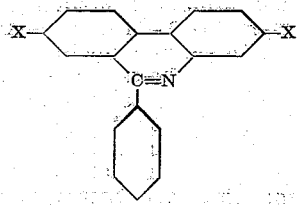

in which X represents a radical convertible to a primary amino group, such as a nitro group, an acylamino group or a carbalkoxyamino group, with an ethyl, propyl or allyl ester of a strong acid, such as an ethyl, propyl or allyl halide, sulphate or toluene sulphonate so as to produce the corresponding 10-ethyl, 10-propyl or 10-allyl quaternary salt which is subsequently treated to convert to radicals X into amino groups.

It will be understood that the compounds of the invention may be treated, if desired, by methods known per se so as to change the anion Y for another such anion.

The invention is illustrated by the following examples:

Example 1

In the preparation of 2:7-diamino-9-phenyl-10-propylphenanthridinium bromide, a mixture of 6 g. of 2:7-dicarbethoxyamino-9-phenyl-phenanthridine (described by Walls, Journal of the Chemical Society, 1947, p. 71) and 8 g. of propyl toluene-p-sulphonate in 8 cc. of anhydrous nitrobenzene is heated, with occasional stirring, at a temperature of 155–160° C. for 6 hours. The mixture is allowed to cool, and the crystalline mass which is formed is broken up and extracted with boiling diethylether and then dried in the steam oven. The crude product so obtained is recrystallised from isopropyl alcohol to give 2:7 - dicarbethoxyamino - 9 - phenyl - 10-propylphenanthridinium toluene - p - sulphonate in the form of orange-yellow crystals, M. P. 220–222° C. (Found: N, 6.8. $C_{36}H_{38}O_7N_3S$ requires N, 6.55.) 7.6 g. of this toluene-p-sulphonate is heated with a mixture of 16 cc. of concentrated sulphuric acid and 8 cc. of water to a temperature of 135–140° C. for a period of 25 minutes. The solution is then cooled and poured into 500 cc. of a mixture of ice and water. After adjusting the pH of the solution to 6.8 by the careful addition of a concentrated solution of ammonia, the solution is concentrated to a volume of approximately 250 cc. To the concentrate is added 30 g. of ammonium bromide and the mixture is allowed to stand for 12 hours at a temperature of 0° C., when a tar separates. The supernatant liquor is decanted, the tar is dissolved in 120 cc. of water, the solution is filtered and the hot filtrate is treated with a hot concentrated aqueous solution containing 20 g. of ammonium bromide, whereby a red tar is precipitated. After allowing the mixture to stand at a temperature of 0° C. for 12 hours, the supernatant liquor is decanted and the residual tar is confined over concentrated sulphuric acid in a vacuum desiccator whereupon a purple solid is formed. This solid is crystallised from a mixture of ethyl alcohol and isopropyl alcohol to give 2:7-diamino-9-phenyl-10-propyl-phenanthridinium bromide in the form of purple crystals which have a melting point of 261–263° C. with decomposition. (Found: C, 64.6; H, 5.7; N, 10.35; Br, 19.0. $C_{22}H_{22}N_3Br$ requires C, 64.7; H, 5.4; N, 10.3; Br, 19.6.)

Example 2

In the preparation of 2:7-diamino-9-phenyl-10-allylphenanthridinium bromide, 5.2 g. of 2:7-dicarbethoxyamino-9-phenylphenanthridine is dissolved in 17.5 cc. of anhydrous nitrobenzene and the solution is allowed to cool to ca. 80° C. The hot solution is heated under reflux on the steam bath whilst 2 cc. of allyl iodide is added slowly down the condenser. When the addition is complete, the mixture is heated on the steam for three hours; after one hour's heating yellow crystals begin to separate. The reaction product is allowed to cool, the mother liquors are decanted, and the solid which remains is washed out of the reaction flask with the aid of 15 cc. of dry ether. This solid is treated with boiling ether and is recrystallised by dissolving in a small quantity of hot absolute alcohol, filtering the solution and treating the cooled filtrate with an excess of dry ether. There is thus obtained in the form of an orange-yellow crystalline solid, 2:7-dicarbethoxyamino-9-phenyl-10-allyl-phenanthridinium iodide which has a melting point of 220–222° C. (Found: N, 70. $C_{28}H_{28}O_4N_3I$ requires N, 7.0.)

The quaternary iodide is converted to the corresponding methane sulphonate in the following manner. An aqueous solution of silver methane sulphonate is obtained by heating under reflux, for five minutes, a suspension of 12 g. of powdered silver oxide in 50 cc. of water containing 4 cc. of methane sulphonic acid. The hot solution is filtered to remove excess silver oxide. 15 cc. of the cold filtrate is added to a hot solution of 4.5 g. of 2:7-dicarbethoxyamino-9-phenyl-10-allyl-phenanthridinium iodide in 65 cc. of methanol. The solution is filtered to remove silver iodide, and the clear yellow filtrate is evaporated almost to dryness under reduced pressure. The cold residue is allowed to crystallise and the crystals which separate are isolated, washed with water and dried in the steam oven.

A mixture of 4 g. of the quaternary methane sulphonate so obtained, 10 cc. of concentrated sulphuric acid and 5 cc. of water, is heated at a temperature of 130° C. for 30 minutes when the evolution of carbon dioxide has ceased. The reaction mixture is cooled and poured into 300 cc. of ice water. The pH of the mixture is adjusted to 7.0 by the addition of aqueous ammonium hydroxide, heated to boiling point and treated with 50 g. of ammonium bromide. The product is allowed to stand overnight before the supernatant liquor is decanted. The residue is washed with a small quantity of ice-water and is then extracted with, successively, 100 cc. 100 cc. and 50 cc. of hot water. The hot extracts are combined after filtration, the filtrate is treated with 30 g. of ammonium bromide and allowed to stand overnight. The tar, which is deposited, is isolated by decantation of the mother liquors, is washed with a small quantity of ice water and is dried over concentrated sulphuric acid in vacuo. The purple powder, which is so obtained, is crystallised from isopropanol. There is thus obtained 2:7-diamino-9-phenyl-10-allylphenanthridinium bromide in the form of a purple crystalline solid which has a melting point of 231–233° C. (Found: C, 64.85; H, 5.11; N, 10.35; Br, 19.2. $C_{22}H_{20}N_3Br$ requires C, 65.2; H, 5.0; N, 10.3; Br, 19.7.)

Example 3

In the preparation of 2:7-diamino-9-phenyl-10-ethylphenanthridinium bromide, 6 g. of 2:7-dicarbethoxyamino-9-phenylphenanthridine is dissolved, with warning in 50 cc. of nitrobenzene. The solution is treated at 160° C. with 4 cc. of diethyl sulphate and the temperature of the mixture is maintained at 160–165° C. for 90 minutes. The solution is allowed to cool and is diluted with an equal volume of anhydrous ether. The solid which separates is isolated, washed with boiling ether and dried in the steam oven. 8 g. of the crude 2:7-diamino-9-phenyl-10-ethyl-phenanthridinium ethosulphate so obtained is heated at 135° C. for 30 minutes with a mixture of 17 cc. of concentrated sulphuric acid and 8.5 cc. of water. The reaction mixture is allowed to cool and is poured into 20° cc. of ice water. The pH of the solution is adjusted to 7.3 by the addition of aqueous ammonium hydroxide before heating the mixture to the boiling point and adding 50 g. of ammonium bromide. The solution so obtained is allowed to stand overnight at room temperature before decanting the mother liquors from the tar which has been deposited. The tar is extracted with 200 cc. of hot water; the extract is cooled to room temperature and its pH adjusted to 7.2 by the addition of aqueous ammonium hydroxide. The solution is filtered, the filtrate is heated to boiling point, treated with 60 g. of ammonium bromide and the mixture is allowed to stand overnight. The tar which separates is washed with ice water and dried in vacuo over concentrated sulphuric acid. A solid is thereby obtained which is recrystallised from a large volume of alcohol. There is thus obtained 2:7-diamino-9-phenyl-10-ethyl-phenanthridinium bromide in the form of dark red crystals which have a melting point of 238–240° C. (Found: N, 10.5. $C_{21}H_{20}N_3Br$ requires N, 10.65.)

Example 4

In the preparation of 2:7-diamino-9-phenyl-10-ethylphenanthridinium bromide, a mixture of 20 g. of 2:7-dinitro-9-phenylphenanthridine and 60 g. of ethyl toluene-p-sulphonate is heated, with stirring, at 186±2° C. for 4.5 hours. The resulting solution is cooled below 100° C. and is poured, with stirring, into 750 cc. of toluene. After the mixture has been allowed to stand overnight the toluene is removed by decantation and the gummy residue is washed with 50 cc. of toluene before being extracted with portions of 220 cc. and 80 cc. of a solution obtained by mixing 180 cc. of alcohol, 120 cc. of water and 1.5 cc. of 5 N sulphuric acid. The extracts so obtained are added as rapidly as possible to a stirred suspension of 15 g. of reduced iron powder in 400 cc. of water. The mixture is stirred and heated under reflux for 4 hours and is then cooled to room temperature. 400 cc. of toluene and 150 cc. of 40% w./w. sodium hydroxide solution is added, the mixture is stirred vigorously for 15–20 minutes and is then filtered. The toluene layer is separated, washed with two portions of 25 cc. of water and is extracted with 325 cc. of 0.1 N hydrochloric acid and then with 75 cc. of water containing 25 cc. of 0.1 N hydrochloric acid. The acid extracts are combined, the pH of the mixture is adjusted to 7.2–7.8 by the addition of dilute ammonium hydroxide solution and, if any tar is precipitated at this stage, the mixture is heated to boiling point and is filtered. The filtrate is treated with a saturated solution containing 50 g. of ammonium bromide and the mixture is allowed to stand overnight at 0° C. The tarry solid which separates is isolated by decantation and is dissolved in 75 cc. of hot water to which is then added 40 cc. of alcohol and 1.5–2 g. of ammonium bromide. The crystals which separate on cooling are isolated by filtration. There is thus obtained 2:7-diamino-9-phenyl-10-ethylphenanthridinium bromide in the form of a purple crystalline solid which has a melting point of 249–251° C. (with decomposition).

We claim:

1. A new phenanthridinium salt having trypanocidal activity and of the general formula:

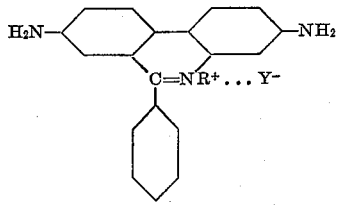

in which R is a radical selected from the group consisting of ethyl, allyl and propyl radicals and Y is a non-toxic anion.

2. A new phenanthridinium salt having trypanocidal activity being 2:7-diamino-9-phenyl-10-ethylphenanthridinium bromide.

3. A new phenanthridinium salt having trypanocidal activity being 2:7-diamino-9-phenyl-10-propylphenanthridinium bromide.

4. A new phenanthridinium salt having trypanocidal activity being 2:7-diamino-9-phenyl-10-allylphenanthridinium bromide.

WALLACE FRANK SHORT.
DOUGLAS ARCHIBALD PEAK.
THOMAS ISWEL WATKINS.

References Cited in the file of this patent
UNITED STATES PATENTS

| Number | Name | Date |
| --- | --- | --- |
| 2,437,869 | Walls | Mar. 16, 1948 |